(12) United States Patent
Finley et al.

(10) Patent No.: US 7,588,829 B2
(45) Date of Patent: Sep. 15, 2009

(54) ARTICLE HAVING AN AESTHETIC COATING

(75) Inventors: James J. Finley, Pittsburgh, PA (US); James P. Thiel, Pittsburgh, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 54 days.

(21) Appl. No.: 10/446,973

(22) Filed: May 28, 2003

(65) Prior Publication Data

US 2003/0224181 A1 Dec. 4, 2003

Related U.S. Application Data

(60) Provisional application No. 60/384,857, filed on May 31, 2002.

(51) Int. Cl.
*B32B 17/06* (2006.01)

(52) U.S. Cl. .............. 428/426; 428/689; 428/699; 428/701; 428/702; 428/432

(58) Field of Classification Search .......... 428/426, 428/430, 432, 433, 434, 446, 448, 697, 698, 428/699, 701, 702, 704
See application file for complete search history.

(56) References Cited

U.S. PATENT DOCUMENTS

| | | | |
|---|---|---|---|
| 4,010,311 A * | 3/1977 | Lewis et al. | 428/412 |
| 4,379,040 A | 4/1983 | Gillery | 204/192 P |
| 4,610,771 A | 9/1986 | Gillery | 204/192.1 |
| 4,716,086 A | 12/1987 | Gillery et al. | 428/630 |
| 4,746,347 A | 5/1988 | Sensi | 65/94 |
| 4,792,536 A | 12/1988 | Pecoraro et al. | 501/70 |
| 4,806,220 A | 2/1989 | Finley | 204/192.27 |
| 4,834,857 A | 5/1989 | Gillery | 204/192.27 |
| 4,861,669 A | 8/1989 | Gillery | 428/434 |
| 4,898,789 A | 2/1990 | Finley | 428/623 |
| 4,898,790 A | 2/1990 | Finley | 428/623 |
| 4,900,633 A | 2/1990 | Gillery | 428/432 |
| 4,902,580 A | 2/1990 | Gillery | 428/623 |
| 4,902,581 A | 2/1990 | Criss | 428/627 |
| 4,920,006 A | 4/1990 | Gillery | 428/432 |
| 4,938,857 A | 7/1990 | Gillery | 204/192.27 |
| 4,948,677 A | 8/1990 | Gillery | 428/623 |
| 4,965,121 A * | 10/1990 | Young et al. | 428/213 |
| 5,028,759 A | 7/1991 | Finley | 219/203 |
| 5,059,295 A | 10/1991 | Finley | 204/192.27 |
| 5,112,693 A | 5/1992 | Gillery | 428/432 |
| 5,240,886 A | 8/1993 | Gulotta et al. | 501/70 |
| 5,302,449 A * | 4/1994 | Eby et al. | 428/336 |
| 5,328,768 A | 7/1994 | Goodwin | 428/428 |
| 5,385,872 A | 1/1995 | Gulotta et al. | 501/71 |
| 5,393,593 A | 2/1995 | Gulotta et al. | 428/220 |
| 5,492,750 A | 2/1996 | Shumaker, Jr. et al. | 428/192 |
| 5,619,059 A | 4/1997 | Li et al. | 257/431 |
| 5,653,903 A | 8/1997 | Pinchok, Jr. et al. | 219/203 |
| 5,770,115 A * | 6/1998 | Misura | 252/586 |
| 5,821,001 A | 10/1998 | Arbab et al. | 428/623 |
| 5,923,471 A | 7/1999 | Wood, II et al. | 359/584 |
| 5,942,331 A * | 8/1999 | Miyauchi et al. | 428/428 |
| 6,416,872 B1 * | 7/2002 | Maschwitz | 428/428 |
| 6,475,626 B1 * | 11/2002 | Stachowiak | 428/428 |
| 6,495,251 B1 | 12/2002 | Arbab et al. | 428/336 |
| 6,576,349 B2 * | 6/2003 | Lingle et al. | 428/432 |
| 6,849,328 B1 * | 2/2005 | Medwick et al. | 428/341 |
| 2002/0136905 A1 * | 9/2002 | Medwick et al. | 428/432 |
| 2003/0180547 A1 * | 9/2003 | Buhay et al. | 428/432 |
| 2004/0009356 A1 * | 1/2004 | Medwick et al. | 428/432 |

FOREIGN PATENT DOCUMENTS

CH 339575 6/1959
JP 03-087352 * 4/1991

OTHER PUBLICATIONS

Document 1 (Technical Guides, Color Models CIELAB).*
U.S. Appl. No. 09/058,440, filed Apr. 9, 1998, now U.S. Patent No. 6,495,251 (included above).

* cited by examiner

*Primary Examiner*—Ling Xu
(74) *Attorney, Agent, or Firm*—Andrew C. Siminerio

(57) ABSTRACT

An article, e.g., a vehicle transparency, includes a first substrate and at least one aesthetic coating deposited over at least a portion of the substrate. The at least one aesthetic coating provides the article with a color defined by $-10 \leq a^* \leq 0$ and $-15 \leq b^* \leq 5$ and a reflectance in the range of 8% to 30%.

34 Claims, 3 Drawing Sheets

US 7,588,829 B2

ARTICLE HAVING AN AESTHETIC COATING

CROSS REFERENCE TO RELATED APPLICATION

This application claims the benefits of U.S. Provisional Application Serial No. 60/384,857, filed May 31, 2002, and herein incorporated by reference in its entirety.

BACKGROUND OF THE INVENTION

1. Field of the Invention

This invention relates generally to methods of making coated articles, such as but not limited to tabletops, shower doors, partitions, and vehicle transparencies, and to the articles made thereby.

2. Technical Considerations

In today's automotive market, a heavy emphasis is placed on automotive styling. The way a vehicle looks can be as important to vehicle sales as the vehicle's mechanical reliability or safety rating. Therefore, automotive manufacturers have gone to great lengths to enhance vehicle styling. These styling enhancements include providing more color selections to the consumer and also providing colors having metallic flakes to provide the vehicle with a "polychromatic effect".

While these styling enhancements have been generally well received by consumers, a problem to date is that even with the new vehicle paint finishes, the automotive transparencies (such as but not limited to windshields, side lights, back lights, moon roofs, and sunroofs) continue to be generally gray or neutral colored. While providing solar control properties, these conventional transparencies provide little enhancement to the vehicle styling.

In nonautomotive fields, it has been known to provide coated articles in which a color is generated by the interference effect between a substrate and a coating. As will be appreciated by one skilled in the art, the term "interference effect" refers to the variation of electromagnetic wave amplitude with distance or time, caused by the superposition of waves of electromagnetic radiation (for example, visible light). These waves can be the result of reflection or transmission at the interfaces of one or more layers in an optical thin film coating. For example, U.S. Pat. No. 6,164,777 discloses a plastic contact lens having an interference coating made of alternating materials of different refractive indices. U.S. Pat. No. 5,923,471 discloses a "hot mirror" for a heat lamp having alternating layers of zirconia and silica. U.S. Publication No. US 2003/0031842 A1 discloses an article with a patterned appearance provided by a visually observable contrast between one or more generally transparent thin film coatings. Other examples of interference coatings and coated articles are disclosed in U.S. Pat. Nos. 5,619,059; 4,902,581; and 5,112,693; and Swiss Patent No. 339575.

While these disclosed coatings are suitable for their intended purpose, numerous other considerations must be addressed in trying to incorporate an interference coating into an automotive transparency. For example, in the United States, government regulations require that all windshields must have a luminous (visible) light transmittance (Lta) of at least 70%. In Europe, the required minimum Lta is 75%. The presence of an interference coating could adversely impact upon the light transmittance of the transparency.

It would be advantageous to provide a method of making an automotive transparency that is aesthetically pleasing and could be used to enhance the styling of a vehicle. It would also be advantageous to provide an automotive transparency that provides the opportunity to color coordinate or match the color of the transparency with the paint color of the vehicle. It would further be advantageous if such a transparency also met the mandated government requirements for automotive transparencies.

SUMMARY OF THE INVENTION

An article, e.g., a vehicle transparency, of the invention comprises a first substrate and at least one aesthetic coating deposited over at least a portion of the substrate. The at least one aesthetic coating can provide the article with a color defined by $-10 \leq a^* \leq 0$ and/or $-15 \leq b^* \leq 5$ and/or a visible light reflectance in the range of 8% to 50%. For example, an article can have an a* in the range of −5 to 0, such as −4 to −1, such as −4 to −1.5. An article can have a b* in the range of −10 to +4, such as −8 to +3. An article can have a reflectance in the range of 8% to 25%, such as 8% to 20%, such as 16% to 20%, such as 9% to 18%. An article of the invention can be a laminated article or a monolithic article. In one particular embodiment, for a vehicle transparency the visible light reflectance can be in the range of 8% to 30%.

In one non-limiting embodiment, the article has a silver appearance and the aesthetic coating provides an a* in the range of −4 to 0 and a b* in the range of −10 to −6. In another non-limiting embodiment, the article has a pewter appearance and the aesthetic coating provides an a* in the range of −5 to −1 and a b* in the range of −3 to +3.

A method of making an article, e.g., a vehicle transparency, having at least one aesthetic coating comprises the steps of depositing at least one aesthetic coating over at least a portion of a first substrate. The at least one aesthetic coating is deposited to a thickness sufficient to provide the first substrate with a color defined by $-5 \leq a^* \leq 0$ and/or $-15 \leq b^* \leq 5$ and/or a visible light reflectance in the range of 8% to 50%, e.g., 8% to 30%.

DESCRIPTION OF THE PREFERRED EMBODIMENTS

Figure 1:
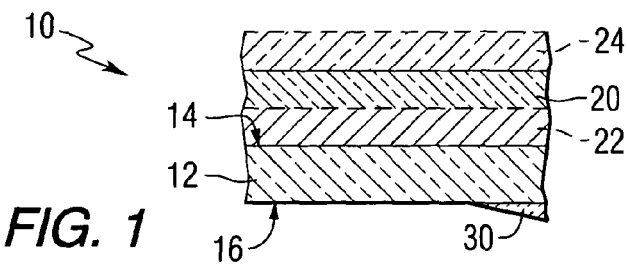
FIG. 1 is a side, sectional view (not to scale) of a coated article incorporating features of the invention.

As used herein, spatial or directional terms, such as "inner", "outer", "left", "right", "above", "below", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the, specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10. Also, as used herein, the terms "deposited over", "applied over", or "provided over" mean deposited, applied, or provided on but not necessarily in contact with the surface. For example, a material "deposited over" a substrate does not preclude the presence of one or more other materials of the same or different composition located between the deposited material and the substrate. Additionally, all references referred to herein are to be understood as being incorporated in their entirety. The term "aesthetic coating" refers to a coating provided to enhance the aesthetic properties of the substrate, e.g., color, shade, hue, or visible light reflectance, but not necessarily the solar control properties of the substrate. However, the aesthetic coating could also provide properties other than aesthetics, such as, for example, ultraviolet (UV) radiation absorption or reflection and/or infrared (IR) absorption or reflection. The aesthetic coating could also provide some solar control effect simply by lowering the visible light transmittance through the article. In the following discussion, the refractive index values are those for a reference wavelength of 550 nanometers (nm). The terms "visible region" or "visible light" refer to electromagnetic radiation having a wavelength in the range of 380 nm to 780 nm. The terms "infrared region" or "infrared radiation" refer to electromagnetic radiation having a wavelength in the range of greater than 780 nm to 100,000 nm. The terms "ultraviolet region" or "ultraviolet radiation" mean electromagnetic energy having a wavelength in the range of 300 nm to less than 380 nm. The term "optical thickness" means the product of a material's refractive index (dimensionless), referenced to 550 nm, times its physical thickness in Angstroms (Å). Visible (luminous) transmittance (Lta) values (Y, x, y) herein are those determinable using C.I.E. (1976) standard illuminant "A" with a 2° observer (in conformance with U.S. Federal standards) over the wavelength range of 380 nm to 770 nm using a Lambda 9 spectrophotometer commercially available from Perkin-Elmer or a BYK-Gardner TCS spectrophotometer commercially available from BYK-Gardner. Reflected color values L*, a*, b* (whether R1 or R2) were determined using an illuminant "D65" with a 10° observer (as is conventional in the automotive field). The term "film" refers to a region of a coating having a desired or selected composition. A "layer" comprises one or more "films". A "coating" or "coating stack" is comprised of one or more "layers".

As will be appreciated from the following discussion, the aesthetic coating of the invention can be utilized in making laminated or non-laminated, e.g., single ply, articles. An exemplary monolithic article of the invention will first be described and then an exemplary laminated article of the invention will be described. By "monolithic" is meant having a single structural substrate or primary ply, e.g., a glass ply. By "primary ply" is meant a primary support or structural member. In the following discussion, the exemplary article (whether laminated or monolithic) is described as an automotive sidelight. However, it is to be understood that the invention is not limited to use with automotive sidelights but can be used with any articles, such as but not limited to, insulating glass units, residential or commercial laminated windows (e.g., skylights), shower doors, partitions, tabletops, or transparencies for land, air, space, above water and underwater vehicles, e.g., automotive windshields, back lights, sun or moon roofs, just to name a few.

FIG. 1 illustrates an exemplary coated article 10 incorporating features of the invention. The article 10 includes a substrate 12 having a first major surface 14 and a second major surface 16. At least one aesthetic coating 20 of the invention is provided over at least a portion of at least one of the major surfaces 14, 16. In the exemplary embodiment shown in FIG. 1, the at least one aesthetic coating 20 is provided over all or substantially all of the first surface 14. By "deposited over substantially all of the first surface" is meant that the at least one aesthetic coating 20 covers the majority of the surface and is not formed in discrete areas. In one embodiment, the at least one aesthetic coating 20 can be provided over the entire first surface 14 with the exception of a non-coated area adjacent or around the peripheral edge of the first surface 14. In another embodiment, in the event that the aesthetic coating interferes with a desired electromagnetic radiation transmission, one or more smaller areas of the coating can be deleted or removed (or masked prior to application) such as for antennas and "Easy-Pass" applications. As will be described in more detail below, an optional functional coating 22 can be deposited over at least a portion of one or more of the major surfaces 14, 16, e.g., such as between the at least one aesthetic coating 20 and the substrate 12, or over the aesthetic coating 20, or the aesthetic coating 20 could be incorporated into the coating stack of the functional coating. As will also be described below, an optional protective coating 24 can be provided over at least a portion of the at least one aesthetic coating 20. An optional coating 30, such as a ceramic coating or shade band, can be deposited over at least a portion of the second major surface 16.

In the broad practice of the invention, the substrate 12 is not limiting to the invention and can be of any desired material having any desired characteristics, such as opaque, translucent, or transparent to visible light. By "transparent" is meant having a transmittance through the substrate of greater than 0% up to 100%. Alternatively, the substrate can be translucent or opaque. By "translucent" is meant allowing electromagnetic energy (e.g., visible light) to pass through the substrate but diffusing this energy such that objects on the side of the substrate opposite to the viewer are not clearly visible. By "opaque" is meant having a visible light transmittance of 0%. Examples of suitable substrates include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); metal substrates, such as but not limited to galvanized steel, stainless steel, and aluminum; ceramic substrates; tile substrates; glass substrates; or mixtures or combinations of any of the above. For example, the substrate can be conventional untinted soda-lime-silica glass, i.e., "clear glass", or can be tinted or otherwise colored glass, borosilicate glass, leaded glass, tempered, untempered, annealed, or heat-strengthened glass. The glass can be of any type, such as conventional float glass or flat glass, and can be of any composition having any optical properties, e.g., any value of visible radiation transmission, ultraviolet radiation transmission, infrared radiation transmission, and/or total solar energy transmission. Typical automotive-type glasses can have such colors as blue, green, bronze, grey, and non-exclusive examples of these glasses include glasses commercially available from PPG Industries, Inc. of Pittsburgh, Pa., under the names Solex® glass, Solargreen® glass, Solextra® glass, and VistaGray™ glass. The glass can be untempered, heat treated, or heat strengthened glass. As used herein, the term "heat treated" means heated to a temperature sufficient to bend or anneal or temper the glass. The term "heat strengthened" means annealed, tempered, or at least partially tempered. Although not limiting to the invention, examples of glass suitable for the substrate 12 are described in U.S. Pat. Nos. 4,746,347; 4,792,536; 5,240,886; 5,385,872; and 5,393,593. The substrate 12 can be of any desired dimensions, e.g., length, width, shape, or thickness. For conventional automotive transparencies, the substrate 12 can typically be up to 10 mm thick, e.g., 1 mm to 10 mm thick, e.g., less than 10 mm thick, e.g., 1 mm to 5 mm thick, e.g., 1.5 mm to 2.5 mm, e.g., 1.6 mm to 2.3 mm. The substrate 12 can be a flat substrate or can be shaped, bent, or curved. By the term "flat substrate" is meant a substrate lying primarily in a single geometric plane, e.g., such as a piece of flat glass produced by a conventional float glass process. By "shaped" or "bent" is meant a substrate that is not flat.

The at least one aesthetic coating 20 can be an interference coating to provide the coated article 10 with aesthetic characteristics but may not impact or may impact only slightly the solar control properties of the coated article 10. As used herein, the term "interference coating" refers to a coating that generates a color (e.g., in transmission or reflection) due to an interference effect (as defined above). In one embodiment, the aesthetic coating 20 includes one or more layers of coating materials having sufficient thickness to provide the coated article 10 with a visible light reflectance in the range of 8% to 50%, e.g., 8% to 30%, e.g., 8% to 25%, e.g., 8% to 20%, e.g., 16% to 20%, e.g., 9% to 18%. The aesthetic coating 20 can provide a reflected color within the color space defined by $-10 \leq a^* \leq 0$, such as in the range of −8 to 0, such as −6 to 0, such as −5 to 0, such as −4 to −1, such as −4 to −1.5. The aesthetic coating 20 can provide a b* in the range of $-15 \leq b^* \leq 5$, such as −10 to +4, such as −8 to +3.

As will be appreciated by one skilled in the art, the color of an object, and in particular glass, is highly subjective. Observed color will depend on the lighting conditions and the preferences of the observer. In order to evaluate color on a quantitative basis, several color order systems have been developed. One such method of specifying color adopted by the International Commission on Illumination (CIE) uses dominant wavelength (DW) and excitation purity (Pe). The numerical values of these two specifications for a given color can be determined by calculating the color coordinates x and y from the so-called tristimulus values X, Y, Z of that color. The color coordinates are then plotted on a 1931 CIE chromaticity diagram and numerically compared with the coordinates of CIE standard illuminant C, as identified in CIE publication No. 15.2. This comparison provides a color space position on the diagram to ascertain the excitation purity and dominant wavelength of the glass color.

In another color order system, the color is specified in terms of hue and lightness. This system is commonly referred to as the CIELAB color system. Hue distinguishes colors such as red, yellow, green and blue. Lightness, or value, distinguishes the degree of lightness or darkness. The numerical values of these characteristics, which are identified as L*, a* and b*, are calculated from the tristimulus values (X, Y, Z). L* indicates the lightness or darkness of the color and represents the lightness plane on which the color resides. a* indicates the position of the color on a red (+a*) green (−a*) axis. b* indicates the color position on a yellow (+b*) blue (−b*) axis. When the rectangular coordinates of the CIELAB system are converted into cylindrical polar coordinates, the resulting color system is known as the CIELCH color system which specifies color in terms of lightness (L*), and hue angle (H°) and chroma (C*). L* indicates the lightness or darkness of the color as in the CIELAB system. Chroma, or saturation or intensity, distinguishes color intensity or clarity (i.e. vividness vs. dullness) and is the vector distance from the center of the color space to the measured color. The lower the chroma of the color, i.e. the less its intensity, the closer the color is to being a so-called neutral color. With respect to the CIELAB system, $C^* = (a^{*2} + b^{*2})^{1/2}$. Hue angle distinguishes colors such as red, yellow, green and blue and is a measure of the angle of the vector extending from the a*, b* coordinates through the center of the CIELCH color space measured counterclockwise from the red (+a*) axis.

It should be appreciated that color may be characterized in any of these color systems and one skilled in the art may calculate equivalent DW and Pe values; L*, a*, b* values; and L*, C*, H° values from the transmittance curves of the viewed glass or composite transparency. A detailed discussion of color calculations is given in U.S. Pat. No. 5,792,559. In the present document, color is characterized using the CIELAB system (L* a* b*). However, it is to be understood that this is simply for ease of discussion and the disclosed colors could be defined by any conventional system, such as those described above.

In one embodiment, the aesthetic coating 20 comprises one or more layers of metal oxide coating materials of sufficient thickness to produce an interference effect color defined by $-10 \leq a^* \leq 0$ and $-15 \leq b^* \leq 5$ and a reflectance in the range of 8% to 50%, e.g., 8% to 30%. Exemplary materials for use in the present invention include, but are not limited to, silica, alumina, zinc oxide, tin oxide, niobium oxide, tantalum oxide, zirconia, titania, carbon (generally known to those in the art as "diamond like carbon" or DLC), alumina, zinc and tin materials (such as but not limited to zinc stannate), and oxides, nitrides, or oxynitrides of metals, such as silicon oxynitrides, or any mixtures containing any one or more of the above materials.

The at least one aesthetic coating 20 can also include one or more additives or dopants to affect the properties of the at least one aesthetic coating 20, such as refractive index, photocatalytic activity, and other like properties known to those skilled in the art. Examples of dopants include, but are not limited to, sodium, nickel, transition metals, and mixtures containing any one or more of the foregoing.

The at least one aesthetic coating 20 can be of any thickness to achieve the desired color and reflectance values described above. As will be appreciated by one skilled in the art, the specific thickness of the at least one aesthetic coating 20 can vary depending upon the selected material(s) in order to achieve the desired color and reflectivity. The at least one aesthetic coating 20 can have a minimum thickness greater than 0 Å. In one non-limiting embodiment, the at least one aesthetic coating 20 can have a maximum thickness of 20,000 Å, such as 15,000 Å, such as 10,000 Å. For optical thicknesses greater than about 1.5 microns, the at least one aesthetic coating 20 can exhibit thick film behavior (as defined, for example, in "Optics of Thin Films", A. Vasicek, North Holland Publishing Company, Amsterdam, Interscience Publishers Inc., New York, N.Y., 1960, pg.139). For example, silica with an index of refraction of about 1.5 can exhibit thick film behavior at a physical thickness of about 9,167 Å (or about 1 micron) and titania with an index of refraction of about 2.5 can exhibit thick film behavior at a physical thickness of about 5,500 Å (about 0.5 micron). In one non-limiting embodiment, the aesthetic coating 20 can have a thickness in the range of greater than 0 Å to 20,000 Å, e.g., greater than 0 Å to 10,000 Å, greater than 0 Å to 5,000 Å, e.g., greater than 0 Å to 1,000 Å, e.g., 100 Å to 500 Å. Additionally, the at least one aesthetic coating 20 need not be of uniform thickness across the entire surface upon which it is deposited. For example, the at least one aesthetic coating 20 can be of non-uniform or varying thickness (e.g., have higher and lower areas of thickness) to provide a perceived color difference over the coated surface, such as a rainbow effect.

In addition to the a*, b* dimensions described above, the coated article 10 can have an L* sufficient to provide the coated article 10 with a desired level of lightness to provide an aesthetically pleasing appearance. In one non-limiting embodiment, the coated article 10 has an L* in the range of 45 to 55.

For use in forward automotive transparencies (such as windshields and front sidelights), the coated article 10 can have an Lta of greater than or equal to 70%, such as greater than or equal to 75%. For non-forward vision panels (e.g., "privacy glass") the Lta can be less than 75%, such as less than 70%.

In order to provide the coated article 10 (in particular a laminated automotive transparency) with an aesthetically desirable shine or sparkle, the coated (laminated) article 10 can have a visible light reflectance in the range of 8% to 50%, such as 8% to 30%, such as 8% to 25%, such as 8% to 20%, such as 15% to 25%, such as 16% to 20%, such as 9% to 19%. As will be appreciated by one skilled in the art, for laminated articles, the reflectance is typically defined with respect to the exterior reflectance of the laminated article. By "exterior reflectance" is meant the reflectance of the exterior surface (No. 1 surface) with the aesthetic coating provided on an interior surface, such as the No. 2 or No. 3 surface.

The at least one aesthetic coating 20 can be a multilayer coating stack having two or more layers of coating materials of different refractive indices. For example, the at least one aesthetic coating 20 can include at least one first layer having a first (low) refractive index and at least one other layer having a second (high) refractive index provided over the first layer. Alternatively, the at least one aesthetic coating can have a first (low) refractive index layer, a second (high) refractive index layer, and a third (medium) refractive index layer, with the first, second, and third layers deposited in any desired order. For example, the second (high) refractive index layer can be provided over the first (low) refractive index layer and the third (medium) refractive index layer can be provided over the second (high) refractive index layer. Alternatively, the aesthetic coating can include a first (medium) refractive index layer, a second (low) refractive index layer provided over the first layer, and a third (high) refractive index layer provided over the second layer.

The terms "low", "medium", and "high" can be relative terms with respect to the materials of the coating stack. For example, in a coating stack a "medium" refractive index material can be any material having a refractive index greater than that of the "low" refractive index material (that is the material having the lowest relative refractive index value for the materials in the stack) and a "high" refractive index material can be any material having a refractive index greater than that of the medium refractive index material. In one embodiment, the material can be deposited with the "medium" refractive index material closest to the substrate (e.g., glass), the "low" refractive index material deposited over the medium refractive index material, and the "high" refractive index material deposited over the low refractive index material. One exemplary coating stack illustrating this structure would be an alumina layer deposited over a substrate, a silica layer deposited over the alumina layer, and a titania layer deposited over the silica layer. In one specific embodiment, the "low refractive index" material can have an index of refraction of less than 1.7. The "high refractive index" material can have a refractive index of greater than 2.1. The "medium refractive index" material can have a refractive index in the range of 1.7 to 2.1. In this embodiment, silica and alumina would be examples of low refractive index materials. Titania would be an example of a high refractive index material. Zinc stannate and zirconia would be examples of medium refractive index materials. In an exemplary two layer system, the first coating layer can include zinc stannate and the second coating layer can include titania. In one embodiment, the zinc stannate layer can have a thickness in the range of 100 Å to 300 Å, such as 200 Å and the titania layer can have a thickness in the range of 100 Å to 300 Å, such as 200 Å.

The at least one aesthetic coating 20 can comprise a single layer, such as but not limited to zirconia. In one embodiment, the single zirconia layer can have a thickness in the range of 70 Å to 700 Å. In another embodiment, the aesthetic coating 20 can include one or more graded layers. By "graded" is meant a layer having an increasing fraction of one or more components and a decreasing fraction of one or more other components when moving from one surface or interface of the layer to the opposed surface or interface. For example, in one embodiment the aesthetic coating 20 can include a graded silica-zirconia layer (i.e., a layer having a composition ranging from 0 wt. % zirconia and 100 wt. % silica at one surface to 100 wt. % zirconia and 0 wt. % silica at the opposed surface) with an optional zirconia layer deposited over the graded layer. In another embodiment, the graded layer can have a thickness of 2,000 Å and the optional zirconia layer can have a thickness of 10,000 Å. In another aspect, the graded layer can vary from one type of material, e.g., an oxide, to another type of material, e.g., a nitride. For example, the graded layer can vary from silicon oxide to silicon nitride.

The at least one aesthetic coating 20 can be deposited in any conventional manner, such as but not limited to, magnetron sputter vapor deposition (MSVD), pyrolytic deposition such as chemical vapor deposition (CVD), spray pyrolysis, atmospheric pressure CVD (APCVD), low-pressure CVD (LPCVD), plasma-enhanced CVD (PEVCD), plasma assisted CVD (PACVD), or thermal evaporation by resistive or electron-beam heating, cathodic arc deposition, plasma spray deposition, wet chemical deposition (e.g., sol-gel, mirror silvering, etc.), or any other desired manner. In one embodiment, the at least one aesthetic coating 20 can be deposited by MSVD. Examples of MSVD coating devices and methods are well understood by those of ordinary skill in the art and are described, for example, in U.S. Pat. Nos. 4,379,040; 4,861,669; 4,898,789; 4,898,790; 4,900,633; 4,920,006; 4,938,857; 5,328,768; and 5,492,750. In the MSVD method, an oxide of a metal or metal alloy can be deposited by sputtering a metal or metal alloy containing cathode in an oxygen containing atmosphere to deposit a metal oxide or metal alloy oxide film on the surface of the substrate. In one embodiment, the aesthetic coating 20 is deposited over all or substantially all of the surface 14, i.e., is not deposited to form discrete coated areas. The at least one aesthetic coating 20 can be deposited over a flat substrate and then the substrate can be bent or shaped in any conventional manner, such as by heating. Alternatively, the at least one aesthetic coating 20 can be deposited over a curved surface, e.g., a substrate that has already been bent or shaped.

In the monolithic embodiment shown in FIG. 1, an optional functional coating 22 can be deposited over one or more of the surfaces 14, 16, such as between the substrate 12 and the at least one aesthetic coating 20, over the aesthetic coating 20, or the aesthetic coating 20 can be incorporated into the coating stack of the functional coating 22. The functional coating 22 can be of any desired type. As used herein, the term "functional coating" refers to a coating which modifies one or more physical properties of the substrate on which it is deposited, e.g., optical, thermal, chemical or mechanical properties, and is not intended to be entirely removed from the substrate during subsequent processing. The functional coating 22 can have one or more functional coating films or layers of the same or different composition or functionality.

The functional coating 22 can be an electrically conductive coating, such as, for example, an electrically conductive coating used to make heatable windows as disclosed in U.S. Pat. Nos. 5,653,903 and 5,028,759, or a single-film or multi-film coating used as an antenna. Likewise, the functional coating 22 can be a solar control coating. As used herein, the term "solar control coating" refers to a coating comprised of one or more layers or films that affect the solar properties of the coated article, such as but not limited to the amount of solar radiation, for example, visible, infrared, or ultraviolet radiation reflected from and/or passing through the coated article, shading coefficient, etc. The solar control coating can block, absorb or filter selected portions of the solar spectrum, such as but not limited to the IR, UV, and/or visible spectrums. Examples of solar control coatings that can be used in the practice of the invention are found, for example, in U.S. Pat. Nos. 4,898,789; 5,821,001; 4,716,086; 4,610,771; 4,902,580; 4,716,086; 4,806,220; 4,898,790; 4,834,857; 4,948,677; 5,059,295; and 5,028,759, and also in U.S. patent application Ser. No. 09/058,440. Alternatively, the functional coating 22 can be a coating to affect the emissivity of the coated article.

Examples of suitable functional coatings for use with the invention are commercially available from PPG Industries, Inc. of Pittsburgh, Pa. under the SUNGATE® and SOLARBAN® families of coatings. Such functional coatings typically include one or more antireflective coating films comprising dielectric or antireflective materials, such as metal oxides or oxides of metal alloys, which are transparent or substantially transparent to visible light. The functional coating can also include one or more infrared reflective films comprising a reflective metal, e.g., a noble metal such as gold, copper or silver, or combinations or alloys thereof, and can further comprise a primer film or barrier film, such as titanium, nickel, chrome, or other primers known in the art, located over and/or under the metal reflective layer(s). The functional coating can have any desired number of infrared reflective films, such as 1 or more silver layers, e.g., 2 or more silver layers, e.g., 3 or more silver layers.

As also shown in FIG. 1, an optional protective coating 24 can be deposited over the at least one aesthetic coating 20. The protective coating 24 can be of any desired thickness. In one exemplary embodiment, the protective coating 24 can have a thickness in the range of 100 Å to 50,000 Å, such as 500 Å to 50,000 Å, e.g., 500 Å to 10,000 Å, such as 100 Å to 2,000 Å. In other non-limiting embodiments, the protective coating 24 can have a thickness in the range of 100 Å to 10 microns, such as 101 Å to 1,000 Å, or 1,000 Å to 1 micron, or 1 micron to 10 microns, or 200 Å to 1,000 Å. Further, the protective coating 24 can be of non-uniform thickness. By "non-uniform thickness" is meant that the thickness of the protective coating 24 can vary over a given unit area, e.g., the protective coating 24 can have high and low spots or areas.

The protective coating 24 can be of any desired material or mixture of materials. In one exemplary embodiment, the protective coating 24 can include one or more metal oxide materials, such as but not limited to, aluminum oxide, silicon oxide, or mixtures thereof. For example, the protective coating can be a single coating layer comprising in the range of 0 wt. % to 100 wt. % alumina and/or 0 wt. % to 100 wt. % silica, such as 5 wt. % to 100 wt. % alumina and 95 wt. % to 0 wt. % silica, such as 10 wt. % to 90 wt. % alumina and 90 wt. % to 10 wt. % silica, such as 15 wt. % to 90 wt. % alumina and 85 wt. % to 10 wt. % silica, such as 50 wt. % to 75 wt. % alumina and 50 wt. % to 25 wt. % silica, such as 50 wt. % to 70 wt. % alumina and 50 wt. % to 30 wt. % silica, such as 35 wt. % to 100 wt. % alumina and 65 wt. % to 0 wt. % silica, e.g., 70 wt. % to 90 wt. % alumina and 10 wt. % to 30 wt. % silica, e.g., 75 wt. % to 85 wt. % alumina and 15 wt. % to 25 wt. % of silica, e.g., 88 wt. % alumina and 12 wt. % silica, e.g., 65 wt. % to 75 wt. % alumina and 25 wt. % to 35 wt. % silica, e.g., 70 wt. % alumina and 30 wt. % silica, e.g., 60 wt. % to less than 75 wt. % alumina and greater than 25 wt. % to 40 wt. % silica. Other materials, such as aluminum, chromium, hafnium, yttrium, nickel, boron, phosphorous, titanium, zirconium, and/or oxides thereof, can also be present, such as to adjust the refractive index of the coating 24. In one embodiment, the refractive index of the protective coating can be in the range of 1 to 3, such as 1 to 2, such as 1.4 to 2, such as 1.4 to 1.8.

Alternatively, the protective coating 24 can be a multilayer coating formed by separately formed layers of metal oxide materials, such as but not limited to a bi-layer formed by one metal oxide containing layer (e.g., a silica and/or alumina containing first layer) formed over another metal oxide containing layer (e.g., a silica and/or alumina containing second layer). The individual layers of the multilayer protective coating 24 can be of any desired thickness.

In one embodiment, the protective coating 24 can comprise a first layer formed over the functional coating and a second layer formed over the first layer. In one non-limiting embodiment, the first layer can comprise alumina or a mixture or alloy comprising alumina and silica. For example, the first layer can comprise a silica/alumina mixture having greater than 5 wt. % alumina, such as greater than 10 wt. % alumina, such as greater than 15 wt. % alumina, such as greater than 30 wt. % alumina, such as greater than 40 wt. % alumina, such as 50 wt. % to 70 wt. % alumina, such as in the range of 70 wt. % to 100 wt. % alumina and 30 wt. % to 0 wt. % silica. In one non-limiting embodiment, the first layer can have a thickness in the range of greater than 0 Å to 1 micron, such as 50 Å to 100 Å, such as 100 Å to 250 Å, such as 101 Å to 250 Å, such as 100 Å to 150 Å, such as greater than 100 Å to 125 Å. The second layer can comprise silica or a mixture or alloy comprising silica and alumina. For example, the second layer can comprise a silica/alumina mixture having greater than 40 wt. % silica, such as greater than 50 wt. % silica, such as greater than 60 wt. % silica, such as greater than 70 wt. % silica, such as greater than 80 wt. % silica, such as in the range of 80 wt. % to 90 wt. % silica and 10 wt. % to 20 wt. % alumina, e.g., 85 wt. % silica and 15 wt. % alumina. In one non-limiting embodiment, the second layer can have a thickness in the range of greater than 0 Å to 2 microns, such as 50 Å to 5,000 Å, such as 50 Å to 2,000 Å, such as 100 Å to 1,000 Å, such as 300 Å to 500 Å, such as 350 Å to 400 Å.

The coating 30 can be, for example, a conventional decorative shade band, such as a colored, ceramic band. The coating 30 can be provided on the surface 16, e.g., around the perimeter of the surface 16 in conventional manner.

Figure 2:
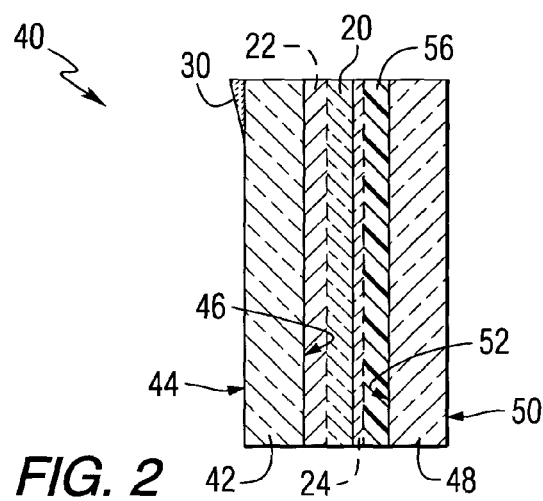
FIG. 2 is a side, sectional view (not to scale) of a laminated automotive transparency incorporating features of the invention.

FIG. 2 illustrates a laminated article 40 incorporating features of the invention. The laminated article 40 includes a first blank or ply 42 having an outer major surface 44 and an inner major surface 46. A second blank or ply 48 is spaced from the first ply 42 and has an outer major surface 50 and an inner major surface 52. The plies 42 and 48 can be laminated together with a polymeric material 56, such as but not limited to a plastic material, such as polyvinyl butyral or a similar material. The polymeric material 56 can include any polymeric material. The "polymeric material" can comprise one polymeric component or can comprise a mixture of different polymeric components, such as but not limited to one or more plastic materials, such as but not limited to one or more thermoset or thermoplastic materials. The polymeric material 56 can adhere the plies together. Useful thermoset components include polyesters, epoxides, phenolics, and polyurethanes such as reaction injected molding urethane (RIM) thermoset materials and mixtures thereof. Useful thermoplastic materials include thermoplastic polyolefins such as polyethylene and polypropylene, polyamides such as nylon, thermoplastic polyurethanes, thermoplastic polyesters, acrylic polymers, vinyl polymers, polycarbonates, acrylonitrilebutadiene-styrene (ABS) copolymers, EPDM rubber, copolymers and mixtures thereof.

Suitable acrylic polymers include copolymers of one or more of acrylic acid, methacrylic acid and alkyl esters thereof, such as methyl methacrylate, ethyl methacrylate, hydroxyethyl methacrylate, butyl methacrylate, ethyl acrylate, hydroxyethyl acrylate, butyl acrylate and 2-ethylhexyl acrylate. Other suitable acrylics and methods for preparing the same are disclosed in U.S. Pat. No. 5,196,485.

Useful polyesters and alkyds can be prepared in a known manner by condensation of polyhydric alcohols, such as ethylene glycol, propylene glycol, butylene glycol, 1,6-hexylene glycol, neopentyl glycol, trimethylolpropane and pentaerythritol, with polycarboxylic acids such as adipic acid, maleic acid, fumaric acid, phthalic acids, trimellitic acid or drying oil fatty acids. Examples of suitable polyester materials are disclosed in U.S. Pat. Nos. 5,739,213 and 5,811,198.

Useful polyurethanes include the reaction products of polymeric polyols such as polyester polyols or acrylic polyols with a polyisocyanate, including aromatic diisocyanates such as 4,4'-diphenylmethane diisocyanate, aliphatic diisocyanates such as 1,6-hexamethylene diisocyanate, and cycloaliphatic diisocyanates such as isophorone diisocyanate and 4,4'-methylene-bis(cyclohexyl isocyanate). The term "polyurethane" as used herein is intended to include polyurethanes as well as polyureas, and poly(urethaneureas).

Suitable epoxy-functional materials are disclosed in U.S. Pat. No. 5,820,987.

Useful vinyl resins include polyvinyl acetyl, polyvinyl formal, and polyvinyl butyral.

The polymeric material 56 can have any desired thickness, e.g., in one non-limiting embodiment for polyvinyl butyral the thickness can be in the range of 0.50 mm to about 0.80 mm, such as 0.76 mm. The polymeric material can have any desired refractive index. In one embodiment, the polymeric material has a refractive index in the range of 1.4 to 1.7, such as 1.5 to 1.6. In the embodiment illustrated in FIG. 2, the aesthetic coating 20 is deposited over at least a portion of the inner major surface 46 of the first ply 42. As also shown in FIG. 2, an optional functional coating 22 such as that described above can be deposited on one or more of the major surfaces of the plies 42, 48. In the exemplary embodiment illustrated in FIG. 2, the functional coating 22 is deposited over the inner surface 46 of the first ply 42. An optional protective coating 24 can also be applied over the at least one aesthetic coating 20. Additionally, an optional coating 30, e.g., an opaque or colored shade band, can be provided on one of the surfaces 44, 46, 50, or 52, such as around the perimeter of the surface 46. The laminated article 40, due to the presence of the at least one aesthetic coating 20, can have a reflected color defined by $-10 \leq a^* \leq 0$, $-15 \leq b^* \leq 5$ (in the area outside that of the coating 30), and a reflectance in the range of 8% to 50%, such as 8% to 30%, such as 10% to 25%, such as 15% to 25%. For example, the aesthetic coating 20 can be laminated between two sheets of glass, between two polymeric sheets (e.g., PVB), or between a sheet of glass and a polymeric sheet, just to name a few. For use in forward automotive vision areas, the article 40 can have an Lta of greater than or equal to 70%, such as greater than or equal to 75%. In one embodiment, the article 40 has an $L^*$ in the range of 45 to 55.

The at least one aesthetic coating 20 of the invention provides an article, such as a monolithic or laminated article, with desirable aesthetic characteristics. An article incorporating the at least one aesthetic coating of the invention is particularly desirable for use in an automotive transparency to provide the transparency with aesthetic characteristics, such as color and/or reflectance, that highlight the exterior and/or interior colors of the automobile and enhance the overall styling of the vehicle.

In a broad aspect of the invention, an automotive transparency made in accordance with the invention can be made of a desired color to match or compliment the color of the vehicle body. As described above, for example, in one embodiment, the article has a silver appearance and the aesthetic coating provides an $a^*$ in the range of $-4$ to $0$ and a $b^*$ in the range of $-10$ to $-6$. In another embodiment, the article has a pewter appearance and the aesthetic coating provides an $a^*$ in the range of $-5$ to $-1$ and a $b^*$ in the range of $-3$ to $+3$. Additionally, the at least one aesthetic coating 20 of the invention can reduce the abrupt visual interface between the decorative shade band 30 and the rest of the transparency.

Illustrating the invention are the following Examples which are not to be considered as limiting the invention to their details.

EXAMPLE I

Several samples of coated articles incorporating at least one coatings of the invention were prepared by conventional MSVD deposition and tested for reflected color ($L^*$, $a^*$, $b^*$) and transmittance (Lta).

Sample A (Laminated)

2.0 mm thick clear glass commercially available from PPG Industries, Inc. of Pittsburgh, Pa./200 Å zinc stannate/200 Å titania/0.76 mm polyvinyl butyral/2.3 mm Solex® glass commercially available from PPG Industries, Inc. of Pittsburgh, Pa. This laminated structure had an Lta of 72.70% and reflected $L^*$ $a^*$ $b^*$ color of 52.27, $-2.35$, and $-8.97$, respectively.

Sample B (Laminated)

2.0 mm thick clear glass/240 Å zinc stannate/160 Å titania/0.76 mm polyvinyl butyral/2.3 mm VistaGray® glass commercially available from PPG Industries, Inc. of Pittsburgh, Pa. This laminated structure had an Lta of 70.55% and reflected $L^*$ $a^*$ $b^*$ color of 47.74, $-2.03$, and $-5.68$, respectively.

Sample C (Monolithic)

2.3 mm thick clear glass/350 Å zirconia.

This structure had an Lta of 80.32% and reflected L* a* b* color of 50.29, −1.76, and −8.09, respectively.

Sample D (Monolithic)

2.3 mm thick clear glass/475 Å zirconia.

This structure had an Lta of 75.57% and reflected L* a* b* color of 54.98, −2.28, and −7.54, respectively.

Sample E (Monolithic with Protective Coating)

4.0 mm thick clear glass/200 Å zinc stannate/200 Å titania/20,000 Å aluminum silicon oxide.

This structure had an Lta of 74% and reflected L* a* b* color of 53, −2.4, and −9.0, respectively.

EXAMPLE II

Additional samples 150 were prepared in accordance with the teachings of the invention and the compositions and various measured optical characteristics are shown in Table 1 below.

In Table 1, the term "mono" means that the sample was monolithic, i.e., non-laminated. All samples not indicated as "mono" were laminated using two pieces of the indicated type of glass. All samples were coated using 2.3 mm glass as the substrate of the type noted in Table 1. The term "VG" (in Table 1 or FIGS. 3-6) means the glass was VistaGray® glass commercially available from PPG Industries, Inc. of Pittsburgh, Pa. The term "SL" (in Table 1 or FIGS. 3-6) means that the glass was Solex® glass also commercially available from PPG Industries, Inc. The term "Clr" refers to clear float glass commercially available from PPG Industries, Inc. The phrase "ox metal" means that the coating was sputtered as a metal and converted to an oxide by heating in a furnace for 2.5 mins. at 1300° F. (703° C.) before lamination. The phrase "react sput" means the coating was sputtered as an oxide and then heated in a furnace for 10 mins. at 320° F. (160° C.) before lamination. All thickness values are in units of Angstroms unless indicated to the contrary. The reported optical values were measured using a Lambda 9 spectrophotometer commercially available from Perkin-Elmer or a BYK-Gardner TCS spectrophotometer commercially available from BYK-Gardner. The optical thicknesses were calculated using a refractive index value of 2.58 for titania and 2.12 for zirconia. The micrograms per square centimeter were determined by x-ray fluorescence. The thickness values were calculated from the micrograms per square centimeter. For a monolithic article, R1 refers to reflectance from the coated side of the article and R2 refers to the reflectance from the non-coated side of the article. For a laminated article, R1 refers to the reflectance from the exterior surface closest to the coating and R2 refers to the reflectance from the exterior surface farthest from the coating. The "clr/clr" designation is a laminate with two pieces of clear float glass to provide a reference.

TABLE 1

| Sample No | Uncoated Light | Coating Material | ug/cm^2 | Opt Thick nd | thickness* Angstroms | A 2° Transmission Y | x | y | TCS Meter D65 10° L* | a* | b* | D65 10° L* | R2 a* | b* | Lambda 9 Solar Properties A.2° | TSET | Calculated from L* R1 | R2 |
|---|---|---|---|---|---|---|---|---|---|---|---|---|---|---|---|---|---|---|
| 1 | VG | TiO2 | ox metal | 2.6 | | 107 | 77.05 | 0.4458 | 0.4132 | 39.96 | −0.85 | −4.87 | 36.02 | −1.12 | −3.20 | 76.48 | 56.00 | 9.52 | 9.02 |
| 2 | VG | TiO2 | ox metal | 5.1 | | 211 | 71.94 | 0.4508 | 0.4154 | 47.34 | −1.15 | −11.90 | 44.47 | −1.96 | −8.37 | 71.21 | 52.74 | 16.28 | 14.17 |
| 3 | VG | TiO2 | ox metal | 7.7 | | 318 | 66.51 | 0.4539 | 0.4161 | 55.24 | −2.19 | −12.14 | 51.14 | −2.92 | −8.35 | | | 23.16 | 19.39 |
| 4 | VG | TiO2 | ox metal | 10.3 | | 425 | 62.19 | 0.4539 | 0.4151 | 60.30 | −3.06 | −8.67 | 55.53 | −3.85 | −5.25 | | | 28.46 | 23.45 |
| 5 | VG | TiO2 | ox metal | 12.9 | | 533 | 59.80 | 0.4499 | 0.4125 | 62.31 | −3.79 | −2.69 | 57.30 | −4.37 | −0.02 | | | 30.77 | 25.23 |
| 6 | VG | TiO2 | ox metal | 15.6 | | 644 | 59.50 | 0.4417 | 0.4084 | 61.59 | −4.36 | 8.02 | 56.70 | −4.71 | 8.95 | | | 29.93 | 24.62 |
| 7 | VG | TiO2 | ox metal | 18.3 | | 756 | 61.55 | 0.4341 | 0.4059 | 58.56 | −3.55 | 20.12 | 54.07 | −3.71 | 18.69 | | | 26.55 | 22.04 |
| 8 | SL | TiO2 | ox metal | 2.6 | | 107 | 82.62 | | | 38.01 | −1.44 | −5.18 | | | | | | 10.09 | |
| 9 | SL | TiO2 | ox metal | 5.1 | | 211 | 77.35 | | | 47.63 | −1.51 | −11.84 | | | | | | 16.50 | |
| 10 | SL | TiO2 | ox metal | 7.7 | | 318 | 71.46 | | | 55.64 | −2.41 | −12.04 | | | | 76.30 | 59.32 | 23.56 | |
| 11 | SL | TiO2 | ox metal | 10.3 | | 425 | 86.63 | | | 60.62 | −3.2 | −8.62 | | | | 70.19 | 55.49 | 28.82 | |
| 12 | SL | TiO2 | ox metal | 12.9 | | 533 | 64.25 | | | 62.59 | −3.93 | −2.58 | | | | | | 31.10 | |
| 13 | SL | TiO2 | ox metal | 15.6 | | 644 | 64 | | | 61.94 | −4.48 | 7.5 | | | | | | 30.33 | |
| 14 | SL | TiO2 | ox metal | 18.3 | | 756 | 67.42 | | | 57.33 | −2.57 | 22.93 | | | | | | 25.26 | |
| 15 | Mono | TiO2 | ox metal | 2.6 | 277 | 107 | 87.25 | 0.4493 | 0.4098 | 41.92 | −0.29 | −8.42 | 41.76 | −0.56 | −8.17 | | | 12.45 | 12.35 |
| 16 | Mono | TiO2 | ox metal | 5.1 | 543 | 211 | 77.16 | 0.4571 | 0.4128 | 56.25 | −1.04 | −14.02 | 55.80 | −1.69 | −13.72 | | | 24.16 | 23.71 |
| 17 | Mono | TiO2 | ox metal | 7.7 | 820 | 318 | 67.45 | 0.4611 | 0.4132 | 65.39 | −1.99 | −12.00 | 64.81 | −2.85 | −11.86 | | | 34.54 | 33.81 |
| 18 | Mono | TiO2 | ox metal | 10.3 | 1098 | 425 | 60.82 | 0.4597 | 0.4113 | 70.29 | −2.49 | −7.52 | 69.65 | −3.38 | −7.61 | | | 41.16 | 40.25 |
| 19 | Mono | TiO2 | ox metal | 12.9 | 1375 | 533 | 57.48 | 0.4518 | 0.4067 | 72.10 | −2.96 | −0.40 | 71.43 | −3.89 | −0.60 | | | 43.81 | 42.82 |
| 20 | Mono | TiO2 | ox metal | 15.6 | 1662 | 644 | 57.93 | 0.4395 | 0.4006 | 70.93 | −3.63 | 11.15 | 70.30 | −4.57 | 10.59 | | | 42.09 | 41.18 |
| 21 | Mono | TiO2 | ox metal | 18.3 | 1950 | 756 | 61.99 | 0.4265 | 0.3963 | 66.85 | −2.56 | 27.70 | 66.21 | −3.57 | 26.99 | | | 36.43 | 35.60 |
| 22 | Mono | ZrO2 | ox metal | 3.8 | 189 | 89 | 89.46 | 0.4469 | 0.4086 | 37.26 | −0.58 | −3.25 | 37.22 | −0.66 | −3.19 | | | 9.68 | 9.66 |
| 23 | Mono | ZrO2 | ox metal | 7.9 | 394 | 186 | 86.02 | 0.4489 | 0.4094 | 43.70 | −0.84 | −6.72 | 43.48 | −1.14 | −6.62 | | | 13.63 | 13.48 |
| 24 | Mono | ZrO2 | ox metal | 12.0 | 598 | 282 | 81.45 | 0.4511 | 0.4099 | 50.38 | −1.35 | −8.03 | 50.07 | −1.80 | −7.98 | | | 18.74 | 18.48 |
| 25 | Mono | ZrO2 | ox metal | 15.9 | 792 | 374 | 76.97 | 0.4522 | 0.4100 | 55.56 | −1.71 | −7.35 | 55.21 | −2.31 | −7.43 | | | 23.48 | 23.13 |
| 26 | Mono | ZrO2 | ox metal | 20.1 | 1001 | 472 | 73.77 | 0.4520 | 0.4095 | 58.74 | −1.88 | −5.59 | 58.41 | −2.58 | −5.74 | | | 26.75 | 26.39 |
| 27 | Mono | ZrO2 | ox metal | 24.2 | 1206 | 569 | 71.06 | 0.4496 | 0.4081 | 61.06 | −1.95 | −1.90 | 60.69 | −2.74 | −2.08 | | | 29.32 | 28.90 |
| 28 | Mono | ZrO2 | ox metal | 28.3 | 1410 | 665 | 70.24 | 0.4466 | 0.4068 | 61.42 | −1.91 | 1.80 | 61.12 | −2.74 | 1.63 | | | 29.73 | 29.39 |
| 29 | SL | ZrO2 | ox metal | 3.8 | | 89 | 83.73 | 0.4415 | 0.4119 | 35.55 | −1.56 | −2.06 | 35.44 | −1.72 | −1.86 | | | 8.78 | 8.72 |
| 30 | SL | ZrO2 | ox metal | 7.9 | | 186 | 82.14 | 0.4426 | 0.4124 | 39.12 | −1.76 | −4.36 | 38.68 | −2.35 | −3.64 | | | 10.73 | 10.47 |
| 31 | SL | ZrO2 | ox metal | 12.0 | | 282 | 79.94 | 0.4438 | 0.4127 | 43.16 | −1.98 | −5.84 | 42.41 | −2.96 | −4.76 | | | 13.27 | 12.77 |
| 32 | SL | ZrO2 | ox metal | 15.9 | | 374 | 77.69 | 0.4443 | 0.4128 | 46.81 | −2.26 | −5.87 | 45.78 | −3.54 | −4.70 | | | 15.87 | 15.11 |
| 33 | SL | ZrO2 | ox metal | 20.1 | | 472 | 76.08 | 0.4442 | 0.4126 | 49.02 | −2.57 | −4.85 | 47.75 | −3.86 | −3.72 | | | 17.61 | 16.60 |
| 34 | SL | ZrO2 | ox metal | 24.2 | | 569 | 74.28 | 0.4429 | 0.4119 | 50.97 | −2.70 | −1.79 | 49.49 | −4.16 | −0.89 | | | 19.24 | 17.99 |
| 35 | SL | ZrO2 | ox metal | 28.3 | | 665 | 74.12 | 0.4416 | 0.4112 | 51.27 | −2.71 | 0.52 | 49.85 | −4.12 | 1.18 | | | 19.50 | 18.29 |
| 36 | VG | ZrO2 | ox metal | 3.8 | | 89 | 77.93 | 0.4447 | 0.4126 | 34.59 | −1.17 | −1.64 | 34.18 | −1.24 | −1.05 | | | 8.30 | 8.10 |
| 37 | VG | ZrO2 | ox metal | 7.9 | | 186 | 76.54 | 0.4456 | 0.4129 | 38.15 | −1.36 | −4.12 | 36.94 | −1.47 | −2.69 | | | 10.17 | 9.51 |

TABLE 1-continued

| Sample No | Uncoated Light | Coating Material | | ug/cm^2 | Opt Thick nd | thickness* Angstroms | Transmission A 2° Y | x | y | TCS Meter D65 10° R1 L* | a* | b* | D65 10° R2 L* | a* | b* | Lambda 9 Solar Properties A.2° | TSET | Calculated from L* R1 | R2 |
|---|---|---|---|---|---|---|---|---|---|---|---|---|---|---|---|---|---|---|---|
| 38 | VG | ZrO2 | ox metal | 12.0 | | 282 | 74.52 | 0.4467 | 0.4132 | 42.48 | −1.70 | −5.73 | 40.40 | −1.86 | −3.76 | | | 12.81 | 11.49 |
| 39 | VG | ZrO2 | ox metal | 15.9 | | 374 | 72.22 | 0.4474 | 0.4134 | 46.32 | −2.08 | −5.74 | 43.53 | .2.39 | −3.51 | | | 15.51 | 13.52 |
| 40 | VG | ZrO2 | ox metal | 20.1 | | 472 | 70.89 | 0.4475 | 0.4132 | 48.42 | −2.31 | −4.80 | 45.32 | −2.67 | −2.66 | | | 17.13 | 14.77 |
| 41 | VG | ZrO2 | ox metal | 24.2 | | 569 | 69.57 | 0.4462 | 0.4124 | 50.45 | −2.48 | −1.77 | 47.00 | −2.91 | −0.02 | | | 18.80 | 16.02 |
| 42 | VG | ZrO2 | ox metal | 28.3 | | 665 | 68.73 | 0.4447 | 0.4117 | 50.78 | −2.48 | 1.13 | 47.19 | −2.80 | 2.38 | | | 19.08 | 16.16 |
| 43 | VG | ZrO2 | react sput | 7.4 | | 208 | 77.38 | | | 36.04 | −1.1 | −2.43 | | | | | | 9.03 | |
| 44 | VG | ZrO2 | react sput | 10.5 | | 296 | 76.51 | | | 38.05 | −1.04 | −3.2 | | | | | | 10.12 | |
| 45 | VG | ZrO2 | react sput | 13.3 | | 375 | 74.86 | | | 41.39 | −1.74 | −4.05 | | | | | | 12.11 | |
| 46 | VG | ZrO2 | react sput | 14.5 | | 409 | 75.28 | | | 40.45 | −1.63 | −2.4 | | | | | | 11.52 | |
| 47 | VG | ZrO2 | react sput | 17.7 | | 499 | 74.04 | | | 43.14 | −1.93 | −1.89 | | | | | | 13.25 | |
| 48 | VG | ZrO2 | react sput | 19.3 | | 544 | 73.54 | | | 43.62 | −2.04 | −0.38 | | | | 72.80 | 53.83 | 13.58 | |
| 49 | VG | ZrO2 | react sput | 22.0 | | 620 | 72.43 | | | 45.58 | −2.17 | 0.92 | | | | 71.52 | 53.09 | 14.96 | |
| 50 | VG | ZrO2 | react sput | 24.7 | | 696 | 71.19 | | | 44.49 | −2.52 | 2.32 | | | | 70.31 | 52.30 | 14.18 | |
| Clr/Clr | | | | | | | 88.79 | | | 34.73 | −0.79 | −0.43 | | | | | | 8.36 | |

Figure 3:
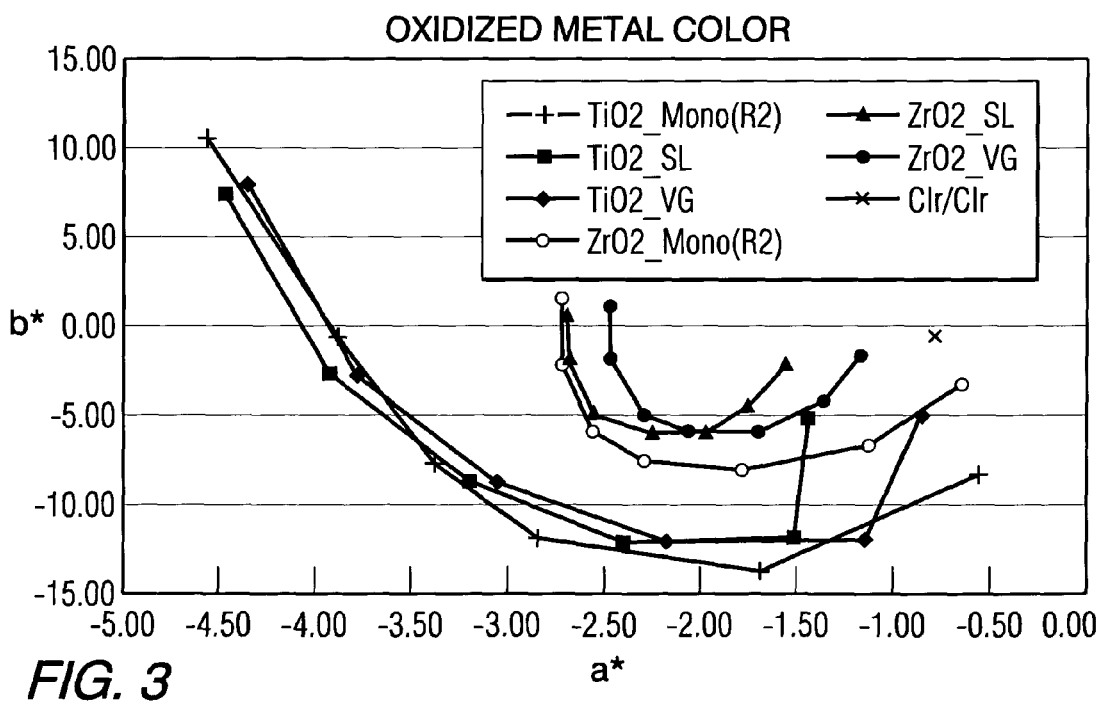
FIG. 3 is a graph of a* and b* values for selected samples from Table 1.
Figure 4:
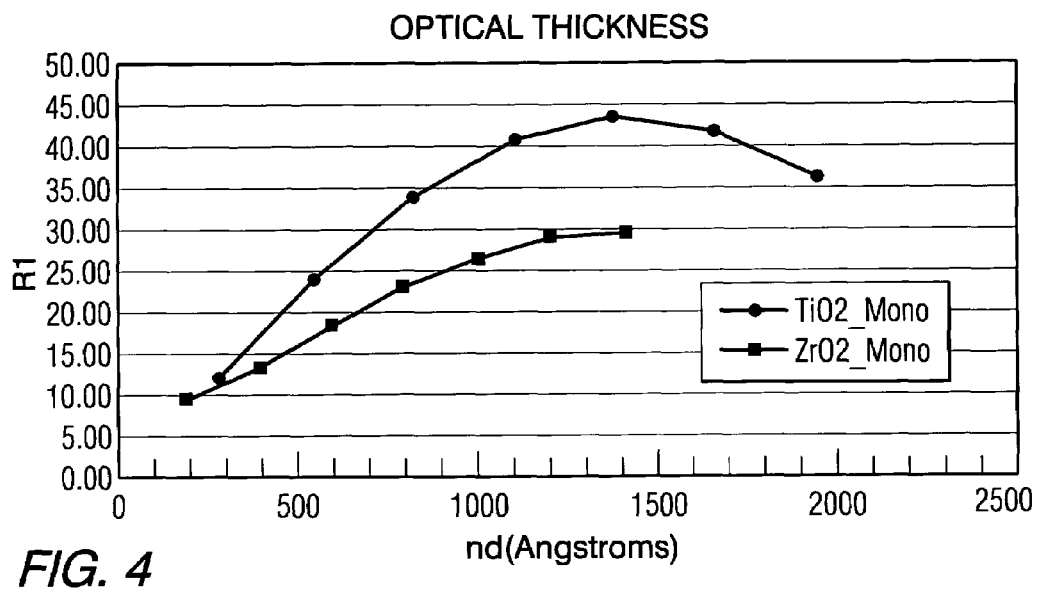
FIG. 4 is a graph of reflectance (R1) versus optical thickness (nd) for selected samples from Table 1.
Figure 5:
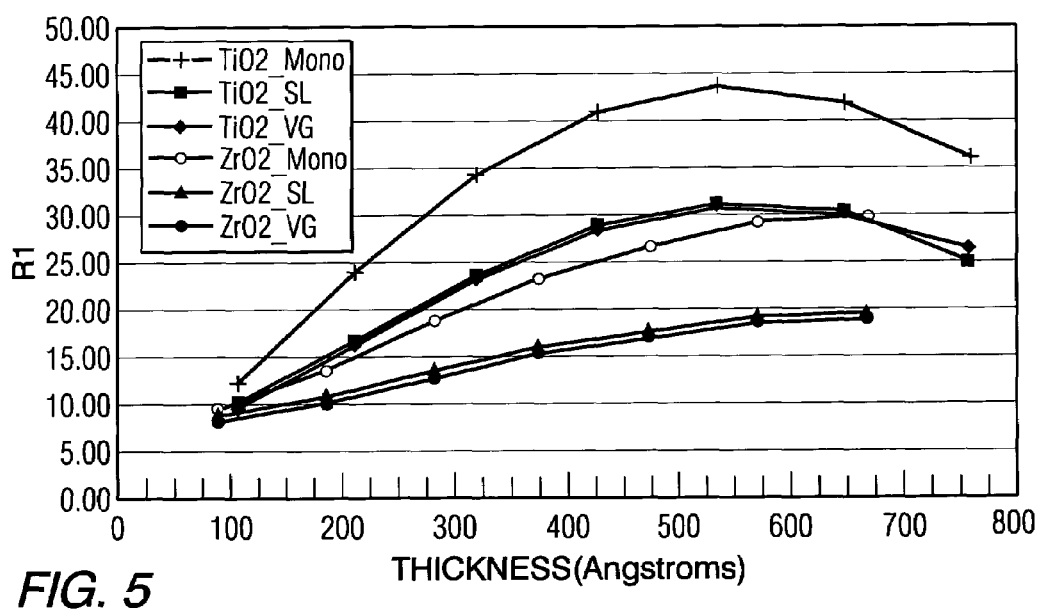
FIG. 5 is a graph of R1 versus thickness for selected samples from Table 1.
Figure 6:
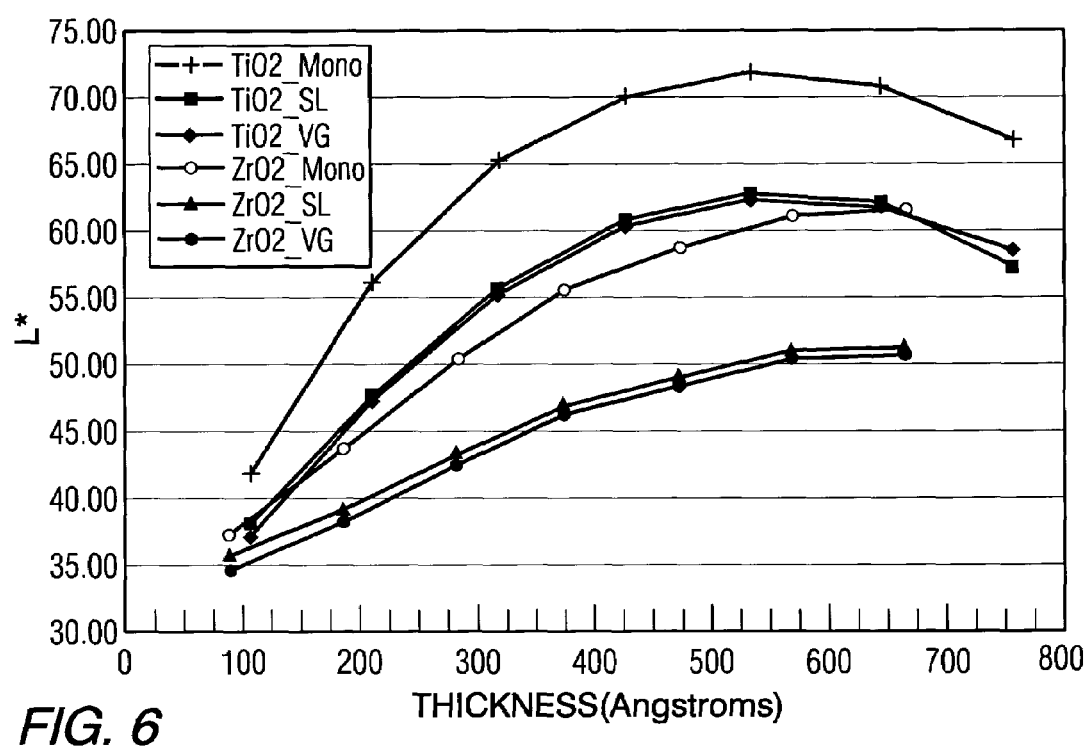
FIG. 6 is a graph of L* versus thickness for the samples shown in FIG. 5.

FIGS. 3-6 are graphs showing various optical characteristics for selected samples from Table 1. FIG. 3 is a graph of a* and b* values for selected samples from Table 1. FIG. 4 is a graph of reflectance (R1) versus optical thickness (nd) for selected samples from Table 1. FIG. 5 is a graph of R1 versus thickness for selected samples from Table 1. FIG. 6 is a graph of L* versus thickness for the samples shown in FIG. 5.

As will be appreciated by one skilled in the art, values between the reported values in FIGS. 3-6 (i.e., values between the plotted curves) can be obtained by utilizing different types of glass (e.g., different colored glass) and/or by varying the metal oxide combinations or mixtures in the aesthetic coating. Additionally, such values can be obtained by including and/or substituting metal nitrides and/or oxynitrides for the oxide materials utilized in making the samples.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A coated article consisting essentially of
    a first substrate; and
    an aesthetic coating consisting of one or more layers deposited over at least a portion of the substrate, the one or more layers being selected from the group consisting of alumina, tin oxide, niobium oxide, tantalum oxide, diamond-like carbon, zirconia, titania, oxides containing zinc and tin, and oxides, nitrides or oxynitrides of silicon, and any mixtures containing any one or more of the above;
    wherein the aesthetic coating providing the article with a color defined by $-10 \leq a^* \leq 0$ and $-15 \leq b^* \leq 5$ and having a visible light reflectance in the range of 8% to 50%, wherein the one or more metal oxide layers comprise at least one zinc stannate layer and at least one titania layer.

2. The article of claim 1, wherein the aesthetic coating has a thickness in the range of greater than 0 Å to 20,000 Å.

3. The article of claim 1, wherein the zinc stannate layer has a thickness in the range of 100 Å to 300 Å and the titania layer has a thickness in the range of 100 Å to 300 Å.

4. The article of claim 1, wherein the aesthetic coating comprises zirconia having a thickness in the range of 70 Å to 700 Å.

5. The article of claim 1, wherein the one or more metal oxide layers comprise one or more of a medium refractive index material, a low refractive index material, and a high refractive index material.

6. The article of claim 1, wherein the aesthetic coating comprises at least one graded layer.

7. The article of claim 1, wherein the aesthetic coating is of non-uniform thickness.

8. The article of claim 1, wherein the aesthetic coating is deposited over substantially all of a major surface of the substrate.

9. The article of claim 1, wherein the article has an L* in the range of 45 to 55.

10. The article of claim 1, wherein the article has a visible light transmission of greater than or equal to 70%.

11. The article of claim 1, wherein the article has a visible light reflectance in the range of 10% to 25%.

12. The article of claim 1, wherein the article has a visible light reflectance in the range of 16% to 20%.

13. The article of claim 1, wherein the article has a visible light reflectance in the range of 8% to 30%.

14. The article of claim 1, wherein the aesthetic coating is part of a multi-layer coating stack.

15. The article of claim 1, wherein the article is an automotive transparency selected from an automotive windshield, sidelight, back light, moon roof, or sunroof.

16. The article of claim 1, wherein the color is defined by $-8 \leq a^* \leq 0$.

17. The article of claim 1, wherein the color is defined by $-6 \leq a^* \leq 0$.

18. The article of claim 1, wherein the color is defined by $-5 \leq a^* \leq 0$.

19. The article of claim 1, wherein the color is defined by $-4 \leq a^* \leq -1$.

20. The article of claim 1, wherein the color is defined by $-8 \leq a^* \leq -1.5$.

21. The article of claim 1, wherein the color is defined by $-10 \leq b^* \leq 4$.

22. The article of claim 1, wherein the color is defined by $-8 \leq b^* \leq 3$.

23. The article of claim 1, wherein the visible light reflectance is in the range of 8% to 30%.

24. The article of claim 1, wherein the visible light reflectance is in the range of 8% to 20%.

25. The article of claim 1, wherein the visible light reflectance is in the range of 15% to 25%.

26. The article of claim 1, wherein the visible light reflectance is in the range of 16% to 20%.

27. The article of claim 1, wherein the visible light reflectance is in the range of 9% to 19%.

28. The article of claim 1, wherein the article has a visible light transmission of greater than or equal to 70%.

29. The article of claim 1, including a second substrate, with the aesthetic coating positioned between the first and second substrates.

30. The article of claim 1, wherein the article is a shaped article.

31. The article of claim 1, wherein the first substrate is selected from glass or polymeric material.

32. The article of claim 31, wherein the first substrate is tempered or annealed glass.

33. The article of claim 29, wherein the first substrate is clear glass and the second substrate is colored glass.

34. The article of claim 29, wherein the article further comprises a polymeric material located between the first and second substrates.

* * * * *